(12) United States Patent
Cortesi

(10) Patent No.: US 7,571,392 B2
(45) Date of Patent: *Aug. 4, 2009

(54) USER DEFINABLE TASK BASED INTERFACE

(75) Inventor: Gino Cortesi, Honey Brook, PA (US)

(73) Assignee: Bentley System, Inc., Exton, PA (US)

( * ) Notice: Subject to any disclaimer, the term of this patent is extended or adjusted under 35 U.S.C. 154(b) by 339 days.

This patent is subject to a terminal disclaimer.

(21) Appl. No.: 11/429,431

(22) Filed: May 8, 2006

(65) Prior Publication Data

US 2006/0271863 A1   Nov. 30, 2006

Related U.S. Application Data

(63) Continuation of application No. 10/274,117, filed on Oct. 21, 2002, now Pat. No. 7,418,666.

(51) Int. Cl.
*G06F 3/00* (2006.01)
*G06F 3/14* (2006.01)
*G06F 17/50* (2006.01)

(52) U.S. Cl. .................. 715/765; 715/810; 715/964; 703/1; 707/1

(58) Field of Classification Search .......... 715/700, 715/764, 765, 810, 961, 864, 968; 707/1, 707/10, 102, 104.1; 703/1
See application file for complete search history.

(56) References Cited

U.S. PATENT DOCUMENTS 5,361,871 A * 11/1994 Gupta et al. ............... 186/61

5,467,444 A * 11/1995 Kawamura et al. .......... 345/441

(Continued)

FOREIGN PATENT DOCUMENTS

JP   2004220390   8/2004

(Continued)

*Primary Examiner*—X. L Bautista
(74) *Attorney, Agent, or Firm*—Venable LLP; James R. Burdett; Jeffri A. Kaminski

(57) ABSTRACT

A system and method providing a user definable task based interface is described. A software program typically includes a number of tools. The tools may be utilized to perform operations on data, such as creating or editing a file using the software program. A user of the software program may organize the tools into tasks, based on the what the tools are used for. A task may be defined as a set of tools grouped to facilitate a particular work item. The task and associated tools are then presented together in the user interface. For example, a task may be to "draw a foundation." The tools necessary for drawing a foundation may include measuring, drawing boundaries, etc. The tools for these steps in drawing the foundation may be grouped together into a task. The task and associated tools may then presented to a user via a user interface for the software program. For example, an icon representing the task "draw a foundation" may be presented in the user interface. The user may select the icon of the name of the task and be presented with the tools necessary to accomplish the task. Users of the software program may be given the ability to customize the user interface and define the tasks and tools presented in the user interface. The definitions may be stored in a central location and be used by multiples users and files.

5 Claims, 3 Drawing Sheets

U.S. PATENT DOCUMENTS

| | | |
|---|---|---|
| 6,289,317 B1 | 9/2001 | Peterson |
| 6,366,782 B1 | 4/2002 | Fumarolo et al. |
| 6,538,623 B1 | 3/2003 | Parnian et al. |
| 6,857,105 B1 | 2/2005 | Fox et al. |
| 6,868,340 B2 | 3/2005 | Alexander et al. |
| 6,895,373 B2 * | 5/2005 | Garcia et al. .................. 703/18 |
| 6,925,609 B1 | 8/2005 | Lucke |
| 6,959,421 B1 | 10/2005 | Bartz et al. |
| 6,966,033 B1 | 11/2005 | Gasser et al. |
| 6,970,791 B1 | 11/2005 | Potter et al. |
| 2001/0035882 A1 | 11/2001 | Stoakley et al. |
| 2003/0012344 A1 | 1/2003 | Agarwal et al. |
| 2004/0085363 A1 | 5/2004 | Lawrence |
| 2004/0103431 A1 | 5/2004 | Davenport et al. |
| 2004/0119752 A1 | 6/2004 | Beringer et al. |
| 2004/0210386 A1 | 10/2004 | Wood et al. |
| 2005/0055330 A1 | 3/2005 | Britton et al. |
| 2005/0138559 A1 | 6/2005 | Santos-Gomez et al. |
| 2005/0138631 A1 | 6/2005 | Bellotti et al. |
| 2005/0160371 A1 | 7/2005 | Karson et al. |
| 2005/0278655 A1 | 12/2005 | Sims |
| 2005/0289479 A1 | 12/2005 | Yoshida et al. |
| 2006/0005132 A1 | 1/2006 | Herdeg, III |
| 2006/0010422 A1 | 1/2006 | Reddy et al. |
| 2006/0026519 A1 | 2/2006 | Vaindiner et al. |
| 2006/0031849 A1 | 2/2006 | Barta et al. |
| 2006/0036964 A1 | 2/2006 | Satterfield et al. |
| 2006/0053376 A1 | 3/2006 | Ng et al. |

FOREIGN PATENT DOCUMENTS

| | | |
|---|---|---|
| WO | WO-98/00768 | 1/1998 |
| WO | WO-01/39409 A1 | 5/2001 |
| WO | WO-2004/055641 | 7/2004 |

* cited by examiner

# USER DEFINABLE TASK BASED INTERFACE

CROSS-REFERENCE TO RELATED APPLICATION

The present application is related to U.S. patent application Ser. No. 10/274,117, filed Oct. 21, 2002 entitled "System, Method and Computer Program Product for Managing CAD Data" to Cortesi et al., of common assignee to the present invention, the contents of which are incorporated herein by reference in their entirety.

FIELD OF THE INVENTION

The present invention relates generally to systems and methods for customizing user interfaces of software programs and more particularly for providing user customization based on tasks.

BACKGROUND OF THE INVENTION

Computer-aided design (CAD) drawings prepared by architects, engineers, designers, planners, and the like require large amounts of data to be stored in files. CAD software includes an API to access the large quantities of data. Applications such as, e.g., MicroStation® products, which are developed by Bentley Systems, Inc., Exton, Pa. U.S.A., and AutoCAD® products, which are developed by Autodesk, Inc., San Rafael, Calif., U.S.A. are typical of such CAD software, which may be used in the Engineering, Construction, and Operations (ECO) marketplace.

Many CAD software packages are outfitted with graphical user interfaces (GUIs). Existing GUIs are similar to those of common office productivity software, such as word-processing programs, in that they provide a large central window showing whatever is being worked on, surrounded by pull-down menus and tool icons. To assist users to locate and utilize functionality of a given software application, a user interface containing a plurality of generic functionality controls is typically provided along an upper, lower or side edge of a displayed workspace in which the user may enter, copy, manipulate and format text or data. Such functionality controls often include selectable buttons with such names as "file," "edit," "view," "insert," "format," and the like. Typically, selection of one of these top-level functionality buttons, for example "format," causes a drop-down menu to be deployed to expose one or more selectable functionality controls associated with the top-level functionality, for example "font" under a top-level functionality of "format."

After a user selects a desired functionality control, or if the user moves the mouse cursor to a different location, the drop-down menu typically disappears. If the user determines that functionality of the first drop-down menu was the desired functionality, the user must remember which top-level functionality was selected, reselect that functionality and then find the desired functionality control all over again. Accordingly, in order to use the functionality of a given software application, the user must know the desired functionality is available under one of the selectable buttons, or the user must select different top-level functionalities until the desired specific functionality is located.

Additionally, a user may be performing a task that requires many different types of tools provided by the software program. The tools used in completing the task may not be generally related to each other, except for being used to perform the task. For example, a task may require one tool in the "insert" category and another tool in the "format" category. Therefore, the user must search in different categories for the various tools needed to accomplish the task.

Such a method of searching for desired functionality is cumbersome and time-consuming. This type of GUI can be difficult to use because it is not designed to make any particular task easy.

Thus, there is a need for a system and method to customize a user interface to include task based data.

SUMMARY OF THE INVENTION

In an exemplary embodiment of the present invention a method of distributing data used in creating CAD design files is provided. The method comprises receiving input defining attributes of elements to be used in a CAD design file; storing the predefined attributes in a resource library at a central location; attaching the resource library to the design file; presenting a graphical user interface (GUI) displaying the contents of the resource library to a user; receiving input from the user selecting contents of the resource library; associating the selected contents with the element being created; and applying the attributes of the selected contents to the element being created.

In another embodiment of the invention, a method of distributing data used in creating CAD design files comprises: receiving input defining a task to be used in creating or editing a CAD design file; storing the task as part of a user interface definition in a library at a central location; attaching the library to the design file; and presenting a graphical user interface (GUI) displaying the contents of the resource library to a user.

In another embodiment of the invention, a method of customizing a user interface comprises: presenting a listing of software tools provided by a software program to a user; receiving user input placing selected tools in a task; associating the selected tools with the respective task; storing the association in the task; storing the task in a first format in a library at a central location; associating the task with a file in the first format; and presenting a user interface including tasks from the library associated with the file when the file is opened using the software program.

In another embodiment of the invention, a method comprises: presenting a user a set of software tools used in a software program; receiving user input defining a task; storing the task definition as part of a user interface definition in a library accessible to multiple users; receiving input associating the library with a file; creating a user interface for the software program based at least in part on the user interface definition from the library when the associated file is opened.

In another embodiment of the invention, a computer useable information storage medium stores computer readable program code for causing a computer to perform the steps of: providing an administrator function allowing the creation of a library defining user interface data including tasks to be applied to a CAD design file; storing the library at a central location; and applying the selected user interface data the software program at runtime.

In another embodiment of the invention, a system comprises: a software program including a plurality of tools for editing regular data files, the regular data files having format; a library storing a user interface definition including a task, the library being associated with at least one regular data file and having the same format as the regular data file and being editable using the tools; a user interface for the software program that includes the tasks in the library when the associated file is opened.

Further features and advantages of the invention, as well as the structure and operation of various embodiments of the invention, are described in detail below with reference to the accompanying drawings.

BRIEF DESCRIPTION OF THE DRAWINGS

The foregoing and other features and advantages of the invention will be apparent from the following, more particular description of a preferred embodiment of the invention, as illustrated in the accompanying drawings wherein like reference numbers generally indicate identical, functionally similar, and/or structurally similar elements. The left most digits in the corresponding reference number indicate the drawing in which an element first appears.

DETAILED DESCRIPTION OF AN EXEMPLARY EMBODIMENT OF THE PRESENT INVENTION

A system and method providing a user definable task based interface is described. A software program typically includes a number of tools. The tools may be utilized to perform operations on data, such as creating or editing a file using the software program. A user of the software program may organize the tools into tasks, based on the what the tools are used for. A task may be defined as a set of tools grouped to facilitate a particular work item. The task and associated tools are then presented together in the user interface. The user thus may have quick and easy access to the tools needed to complete a task. For example, a task may be to "draw a foundation." The tools necessary for drawing a foundation may include measuring, drawing boundaries, etc. The tools for these steps in drawing the foundation may be grouped together into a task. The task and associated tools may then presented to a user via a user interface for the software program. For example, an icon representing the task "draw a foundation" may be presented in the user interface. The user may select the icon or the name of the task and be presented with the tools necessary to accomplish the task. Users of the software program may be given the ability to customize the user interface and define the tasks and tools presented in the user interface. The definitions may be stored in a central location and be used by multiples users and files.

Figure 1:
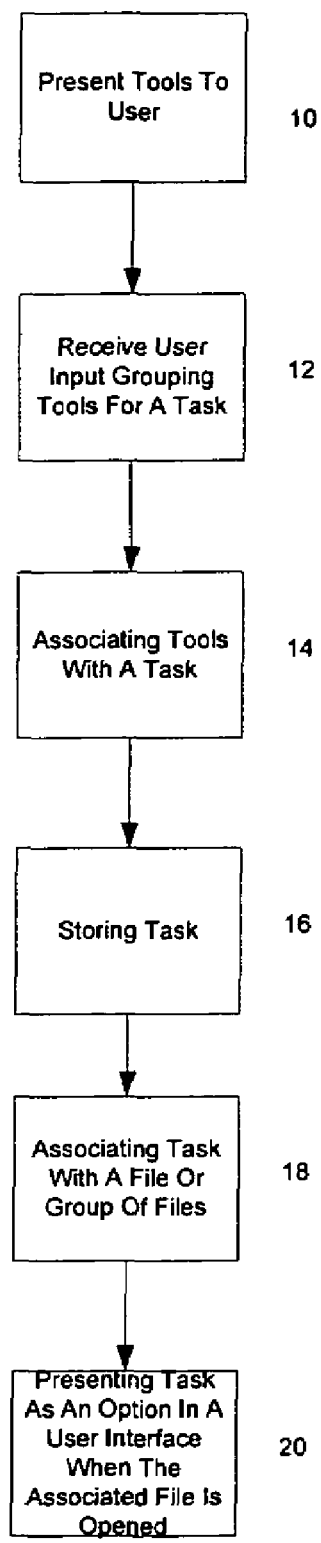
FIG. 1 is a flow diagram of a method according to an embodiment of the invention.

FIG. 1 illustrates a flow chart of an exemplary method of customizing a task based user interface according to an embodiment of the invention. A software program such as a CAD program, modeling program etc., provides a number of different tools. The tools are used to manipulate data stored in regular data files having a format used by the software program. The user may group together the tools needed to perform a particular task. The task and associated tools are included in the user interface. In embodiments of the invention, a listing of software tools available in the software program may be presented to a user, step 10. Some or all of the tools available in the software program may be presented. The user may select the tools necessary to perform a task, User input associating the selected tools with a task is received by the system, step 12. The selected tools are associated with the appropriate task and this information is stored, steps 14-16.

The information may be stored as part of a user interface definition file storing a definition for the user interface. The user interface definition file may have the same format as the regular data file. The task may be associated with a particular regular data file(s) used with the software program, step 18. When the data file is opened using the software program, the appropriate user interface definition file is accessed and the defined tasks and tools are presented in the user interface, step 20.

A software developer may not know the details of how an end user utilizes the software. There may be a general level of knowledge, such as a CAD program is used for designing. There are many different types on design and many smaller tasks that go into creating a design, with different designs requiring very different tasks. Embodiments of the invention leverage the end users intimate and sometimes proprietary knowledge of the design process, allowing users to customize the user interface and create workflows that fit their needs.

A typical CAD project employed in the engineering context is stored in numerous files. Each file typically contains one or more engineering models, each of which represents an engineering domain (e.g., structural, electrical, mechanical, plumbing). Related files and models for a project may be stored in a project folder. Every CAD data file or group of data files, such as a project, can have its own set of user interface definition files.

Different files and projects may require the performance of different tasks. Accordingly, a user interface including different tasks may be associated with different files, projects, project folders, models etc. A user may associate a task with a particular project, design file, etc. When the design file or project is opened, the system accesses the associated file including the user interface definition (UID) and presents a user interface including the task and associated tools defined by the library file. The user can then select the appropriate task and have easy access to the tools necessary to perform that task.

In an exemplary embodiment, the system and method provide the ability to store user interface data in a library. A library includes user interface definition files that can be associated with or attached to a regular data file either automatically or manually. The UID files are collections of user interface data. The UID file defines properties of a user interface for a regular data file, such as a CAD design file. Typically, the library includes resources, such as tools and tasks, that are to be standardized across a project, file, or model. The library and the regular data file should be in the same format. The library should be accessible by multiple users.

The method according to an embodiment of the invention may be implemented via a software program operating in a client-server environment. The software program may be part of a CAD software program or a separate program. The software program may include portions running on the client, the server, or both. The CAD software program may be used for CAD design files.

The software program implementing a method according to an embodiment of the invention may provide different functionality for administrators and for regular users. For example, an administrator may be given permission to control the creation and management of a library through an administrator function. A user may be given permission to access and use the library in creating a UID file through a user function. The library should be stored at a central location such as a data store, data base, etc. to allow various users access to the library. The library is preferably accessed as the CAD design is being created. The user interface defined in the library is then applied to the user interface presented by the software program for creating and editing the CAD design file. The tasks defined in the library can be applied across a project to help standardize workflow and improve efficiency.

Once a UID file is set in a library, the UID file can be set with permissions to allow only certain users access to the file. Permission to make changes to the UID file is typically limited to a CAD administrator. Thus, the resource file is essentially made accessible to regular users as a read-only file, where the UI data can be utilized, but the making of any modification to the UI data is prevented.

Setting up the creation and management of files and libraries as an administrative function provides control over the design files that are created. For example, if a UID file needs to be modified and this UID file is changed at the administrative level, essentially, all of the design files that utilize this UID file are affected globally. Any change or modification can be made very easily and quickly, affecting a few files to hundreds of files. Modifying UID files through a resource library is a very powerful administrative tool and can be used to apply design standards across a project. The library file format is preferably the same format as that of a regular data file. Therefore, the administrator can use the same powerful tools that are available to a regular user to create and modify the UID file.

As mentioned above, the library may include resources, such as icons, tools and tasks. Embodiments of the invention are described in more detail below using tools and tasks as an example of data stored in the library, but the description is equally applicable to other definitions of data and libraries.

A software program according to an exemplary embodiment of the invention presents a number of tools that can be used, for example, to create and edit regular data files. The software program may include a set of standard tools. The ability for a user to create custom tools and toolboxes may also be provided. Custom tools may be copies of the standard tools modified to fit a user's needs or they may be new tools created by the user. The custom tools may be set up to help the user perform numerous tasks. For example, in the CAD environment, the custom tools may be used to help the user draw elements, run key-in commands, run other computer programs, link to websites, and more.

Tools may be placed in toolboxes, which are used to organize tools. The toolboxes can include copies of standard tools, custom tools or combinations of different types of tools. Each tool should only be in one toolbox. That is, each tool should only have one physical location. The software provider can not supply tools in multiple toolboxes. Doing so would make the real location of the tool unclear, that is, which tool is the original. Users may be able to place copies of standard tools into user created toolboxes.

The tools and/or toolboxes can be grouped into tasks. A task may be a set of tools grouped together to facilitate a particular work flow. By defining and grouping tasks, a user can create a task based user interface. The software program may be provided with a set of standard workflows that a user may customize. Tasks allow the software developer to provide for customization of the user interface without the need to duplicate tools.

An analogy is that toolboxes are like the drawers of a tool chest. One drawer may contain screwdrivers, another drawer may contain pliers, another drawer may contain wrenches, and another drawer may contain hammers. A task may be "work on the lawn mower." Another task may be "hang a picture." Each task defines what tools are needed from what drawers to complete the task. A screwdriver may be needed for both tasks. When a task is selected, the task is automatically populated with the proper tools from each drawer. Each drawer need not be accessed to find the appropriate tool, nor is the entire tool chest needed to complete the task.

The task based user interface data is stored in the library which is then accessed by multiple users. As described above, a library is a file that stores resources, such as the user interface definition, that is used over multiple regular data files.

The tools grouped into a task can be standard tools, custom tools, or a combination of both types. Tools may be organized with a task into standard toolboxes, custom toolboxes or a combination of both types. The user interface for the software program may contain all or some of the tools and toolboxes needed by a user to complete their work, grouped the way the user defines the tasks.

Figure 2:
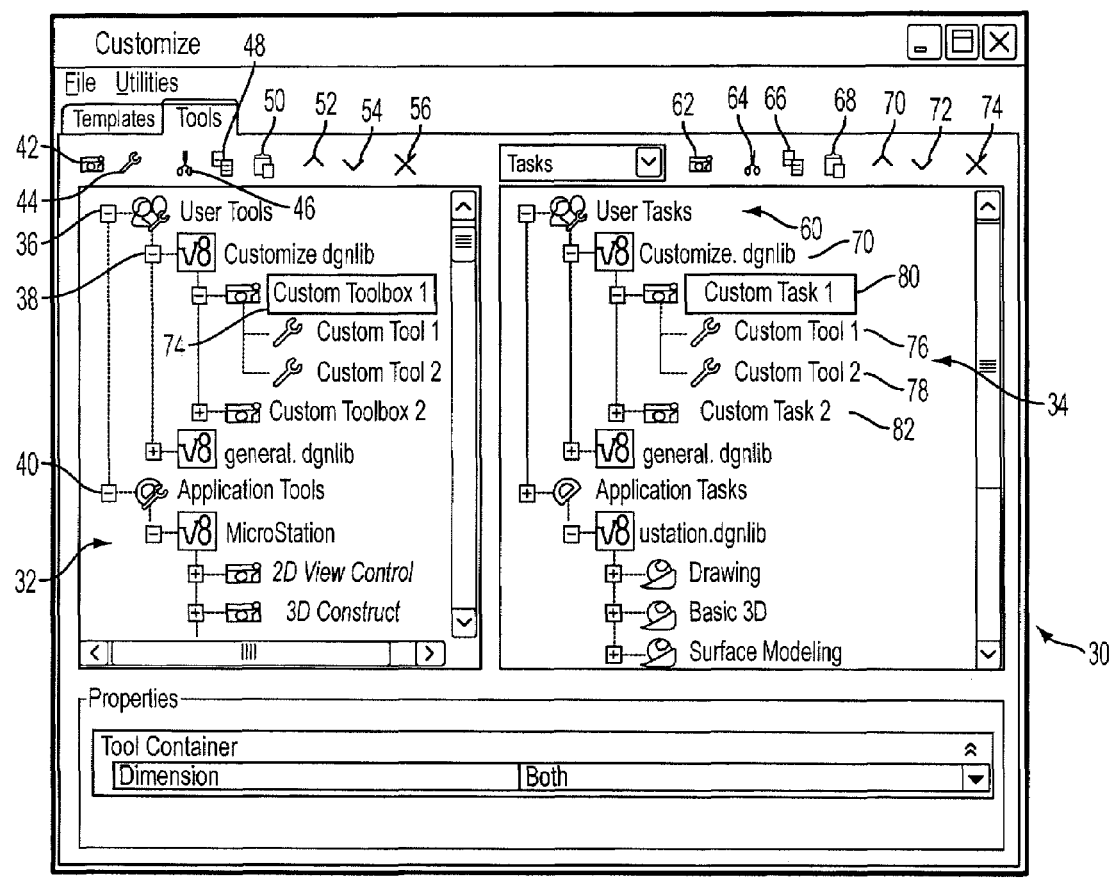
FIG. 2 is a diagram of user interface according to an embodiment of the invention.

In embodiments of the invention, the library may be stored in the same format that is used by the software program to edit and create design files. Therefore, the same software program may be used to edit and create both the user interface definition files and design files. A GUI may be provided to create custom tools and toolboxes and tasks. FIG. 2 illustrates an exemplary GUI. The GUI illustrated includes two dialog boxes, 32, 34. Dialog box 32 is used to create and organize tools. The standard tools provided with the software program may be shown separate from customized tools created by the user. In the example shown, a directory 36 having a tree structure lists the available tools. Only a selection or a portion of all available tools may be shown in the dialog box 32. The directory 36 includes two main headings, one for the customized tools 38 and another for the standard tools 40. Each of these headings may be expanded in a known manner to illustrate additional branches of the directory. Icons 42-56 on tab 58 are respectively used to add, cut, copy, paste, move up, move down, and delete toolboxes and tools. Tools can be moved between toolboxes by dragging and dropping the corresponding tool icon to the desired toolbox in a known manner. Icons 52 and 54 are used to move a tool up or down within a order of the tools within a toolbox. The add tool icon 42 can be used to create new tools, such macros, etc.

Dialog box 34 is used to create and edit tasks. The tasks are shown in a directory 60 having a tree structure. Icons 62-74 are respectively used to add, cut, copy, paste, move up or down, and delete tasks. Tasks may also be added by clicking or dragging a tool or toolbox from the dialog box 32 into an open library file in the dialog box 34. Tools may be added to tasks by clicking and dragging the tools from the dialog box 32 into a task listed in dialog box 34. Once a tool has been added to a task, the icons 64-72 may be used to operate on the task. For example, to add a task, as shown in FIG. 2, the customize .DGNLIB file 70 is selected. File 70 is a library. Custom Task 1 within the customized .DGNLIB library is selected. To add a new task within the selected task, the new task icon 62 is clicked. A new task appears in the directory with the name "new task". A name for the task may then be keyed in by the user.

Custom Task 1 includes Custom Tool 1 and Custom Tool 2. Custom Tool 1 and Custom Tool 2 may be added to Task 1 by clicking toolbox 74 in dialog box 32 and dragging the toolbox into Custom Task 1 in dialog box 34. Icons 76, 78 for Custom Tool 1 and Custom Tool 2 are then added to Task 1. The tools within a task can be arranged in any order desired by the user. Typically, the user arranges the task in a suggested order of use for performing the task. For example, tool one may be used to perform the first step of the task, tool two the next step etc. Icons 70 and 72 may be used to reorder the tools within a task. This may be done by selecting the icon for a tool and then clicking the corresponding move up or move down icon. When the task is presented to the user in the user interface, the tools are listed in the desired order. The tools may be used in an order different from the order presented in the user interface.

Tasks should not contain the copies of the tools but only references to the tools and toolboxes. The task stores a path, for example, the name of the toolbox and tool, within the task. Therefore, the tasks can contain overlapping sets of tools. For example, one custom drawing tool and two tasks, task one and task two, can be created. Each task may refer to the same custom drawing tool. When task one is being worked on, task one is selected and the custom drawing tool appears automatically in the user interface, along with the other tools that are needed for task one. When task two is being worked on, task two is selected from the user interface and the custom drawing tool appears automatically along with a different set of tools that are needed for task two. If the custom drawing tool needs to be modified, it may be modified only once. Each task that references the custom tool then has the updated custom tool.

A series of tasks may be created to define a workflow. For example, task 80 may be first task in the workflow followed by task 82, etc. The order of the tasks may be changed by selecting the desired task and the corresponding icon 70, 72 to move up or move down the task within the workflow. For example, a user may be designing a house. The user may have discovered the creation a house design flows best by first designing the foundation, followed, in order, by the framing, walls and roof. The user can create tasks for each of designing the foundation, framing, walls, and roof and then order the tasks to create an efficient work flow.

Once the tools and tasks have been created, the tasks are saved in the library. The library is then associated with a project, or design file(s). The library stores the user interface definition including the tasks and associated tools. Once a library is created it needs to be made available to users. The library should be stored at a central location that is accessible to all users who need access. For example, the resource library may be stored in database that communicates with servers. Many libraries containing numerous UID files may be created and stored on database. Only some of these resource libraries and UID files may be applicable to a particular project, design file, or model. Therefore, a mechanism for making the relevant UID files available to a user should be provided. In an exemplary embodiment, this is accomplished by attaching a resource library to a design file. Once a resource library is attached to a design file, the UID files and data in that library become available to the user. A more detailed description of attaching a library to a design file is provided in U.S. patent Ser. No. 10/274,117. The resource libraries can be processed at run time to account for any changes to the resource library and distributed to users through a graphical user interface (GUI). A resource file has a type and a name that is used to distribute it to the correct locations in the software program's GUI. For example, resource libraries may be defined with an *.dgnlib extension.

Figure 3:
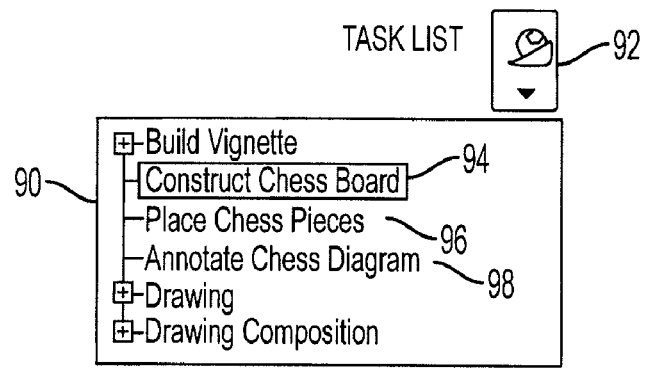
FIG. 3 is a diagram of user interface according to an embodiment of the invention.
Figure 4:
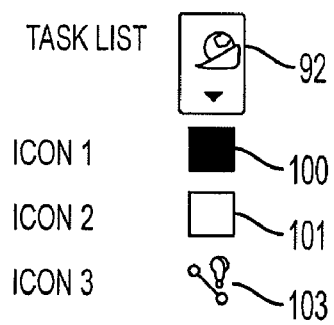
FIG. 4 is a diagram of user interface according to an embodiment of the invention.

When the corresponding design file is opened the library is accessed, the task and tool listing is presented in the user interface. An exemplary user interface is shown in FIGS. 3 and 4. Tasks may appear in a task list 90, as shown FIG. 3. The task list may be displayed when a task icon 92 is clicked. The task list should include all tasks specified in the libraries specified by the project, design file, etc. Task list 92 includes the tasks construct chess board 94, place chess pieces 96, and annotate chess diagram 98, with the task 94 selected.

When a task from the task list 90 is selected it becomes the active task. The active task's tools appear in a task navigation tool bar. As shown in FIG. 4, the icons 100-103 are presented. Icons 100-103 represent the tools for drawing a chess diagram. When an icon 100-103 is selected, the corresponding tool is retrieved and presented to the user. Thus, the user can quickly and easily access the tools needed for a task. Additionally, a standard CAD tool can be used to create and edit UID files. No special tool is required for either the administrator or the regular user.

Additionally, feedback information provided to the user. For example, information regarding the file may be displayed on the user interface when a cursor is positioned on the display. Different information may be useful depending on the task being performed. Information provided to the user may be varied based on the active task. For example, assume a visualization task is the active task. As the cursor is moved over a surface of the design, feedback information regarding the material characteristics, amount of light hitting the surface, etc. may be provided to the user. If a modeling task is the active task, the feedback information may include level, color, line style, line weight, surface area, etc. Different information may be provided depending of the specific implementation.

The embodiments illustrated and discussed in this specification are intended only to teach those skilled in the art the best way known to the inventors to make and use the invention. Nothing in this specification should be considered as limiting the scope of the present invention. The above-described embodiments of the invention may be modified or varied, and elements added or omitted, without departing from the invention, as appreciated by those skilled in the art in light of the above teachings. It is therefore to be understood that, within the scope of the claims and their equivalents, the invention may be practiced otherwise than as specifically described. For example, the sequence of performing the steps of the methods described above may be varied as long as the above-described dependencies are maintained. Also, steps, such as associating the library with a file or project, are optional and may be omitted.

What is claimed is:

1. A method of distributing data used in creating CAD design files, comprising:
   receiving input from a user defining a task to be used in creating or editing a CAD design file;
   storing the task as part of a user interface definition in a library having a same file format as the CAD design file at a central location;
   attaching the library to the design file;
   receiving input from a user selecting the design file;
   retrieving the user interface definition from the library at run time;
   presenting a graphical user interface (GUI) displaying the task of the user interface definition to the user;
   receiving input from the user selecting the task to obtain a selected task; and
   displaying at least one tool associated with the selected task.

2. The method of claim 1, further comprising controlling the ability to change the resource library via an administrator function.

3. The method of claim 1, further comprising manually attaching the resource file to the design file.

4. The method of claim 1, further comprising automatically attaching the resource file to the design file.

5. A system for customizing a user interface, comprising:
   means for receiving input from a user defining tasks to be used in a CAD design file;
   means for storing the tasks in a library having a same file format as the CAD design file at a central location;
   means for attaching the library to the design file;
   receiving input from a user selecting the design file;
   retrieving the user interface definition from the library at run time;
   means for presenting a graphical user interface (GUI) defined at least in part by the task of the user interface definition to the user;
   receiving input from the user selecting the task to obtain a selected task; and
   displaying at least one tool associated with the selected task.

* * * * *

UNITED STATES PATENT AND TRADEMARK OFFICE
CERTIFICATE OF CORRECTION

PATENT NO.       : 7,571,392 B2  
APPLICATION NO.  : 11/429431  
DATED            : August 4, 2009  
INVENTOR(S)      : Gino Cortesi Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 427 days.

Signed and Sealed this

Seventh Day of September, 2010

David J. Kappos  
*Director of the United States Patent and Trademark Office*